(12) United States Patent
Mollhagen

(10) Patent No.: US 8,100,091 B2
(45) Date of Patent: Jan. 24, 2012

(54) LIVESTOCK MOVING SYSTEM AND METHOD

(76) Inventor: Jon Davis Mollhagen, Lorraine, KS (US)

( * ) Notice: Subject to any disclaimer, the term of this patent is extended or adjusted under 35 U.S.C. 154(b) by 0 days.

(21) Appl. No.: 12/978,491

(22) Filed: Dec. 24, 2010

(65) Prior Publication Data

US 2011/0247571 A1    Oct. 13, 2011

Related U.S. Application Data

(63) Continuation of application No. 11/235,932, filed on Sep. 27, 2005, now Pat. No. 7,900,587.

(60) Provisional application No. 60/613,878, filed on Sep. 28, 2004.

(51) Int. Cl.
    *B65G 11/00*    (2006.01)

(52) U.S. Cl. ....................................... 119/843

(58) Field of Classification Search .................. 119/843, 119/512, 701, 704, 840–842, 510, 514, 502, 119/845, 524, 846; D30/108
    See application file for complete search history.

(56) References Cited

U.S. PATENT DOCUMENTS

| | | |
|---|---|---|
| 3,246,631 A | 4/1966 | Holm |
| 4,507,993 A | 4/1985 | Silverman et al. |
| 4,535,723 A | 8/1985 | Gealy |
| 4,829,936 A | 5/1989 | Mollhagen |
| 4,898,121 A | 2/1990 | Reynolds |
| 4,917,048 A | 4/1990 | Beattie et al. |
| RE33,959 E | 6/1992 | Mollhagen |
| 5,622,141 A | 4/1997 | Lareva |
| 6,021,742 A | 2/2000 | Cummings |
| 6,609,477 B1 | 8/2003 | White |
| 7,174,853 B1 | 2/2007 | Donaldson |
| 2006/0112900 A1 | 6/2006 | Mayne |
| 2006/0112904 A1 | 6/2006 | Mollhagen |

FOREIGN PATENT DOCUMENTS

CA    2521350    3/2006

OTHER PUBLICATIONS

Office Action issued by the Canadian Intellectual Property Office on Sep. 9, 2011 in response to Canadian Application No. 2,521,350 which was filed on Sep. 27, 2005.

*Primary Examiner* — Timothy D Collins
*Assistant Examiner* — Valentina Xavier
(74) *Attorney, Agent, or Firm* — Robert O. Blinn

(57) ABSTRACT

A system and method for moving livestock includes a sequence of interconnected semicircular enclosures in which the periphery of each enclosure extends generally to the center of the next enclosure. At the center of each enclosure is a turret unit including a support frame, a turret frame and a panel. The panel extends generally to the edge of the enclosure. The turret frame and panel are capable of two modes of movement: a sweeping mode and a shuttle mode. In the sweeping mode, the turret frame rotates the extended panel as the panel sweeps around the semicircular enclosure. In the shuttle mode the panel is translated across the enclosure from one side of the turret frame to the other side of the turret frame. Panels can thus be alternately swept around their respective enclosures and shuttled across their respective enclosures to present translating enclosed areas for livestock as the livestock progress through a series of interconnected semicircular enclosures.

11 Claims, 19 Drawing Sheets

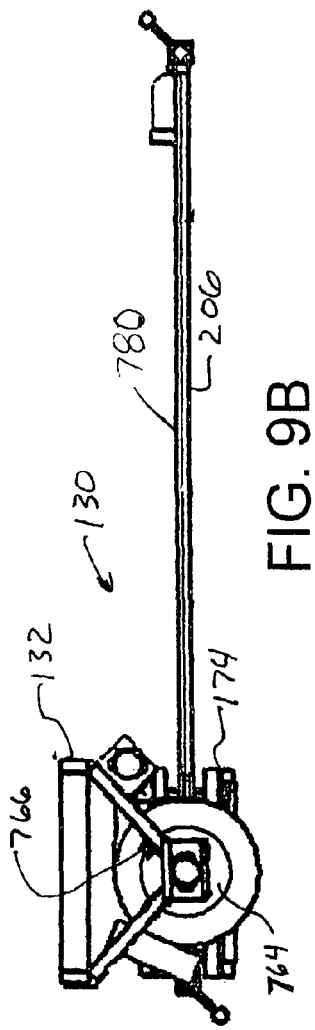
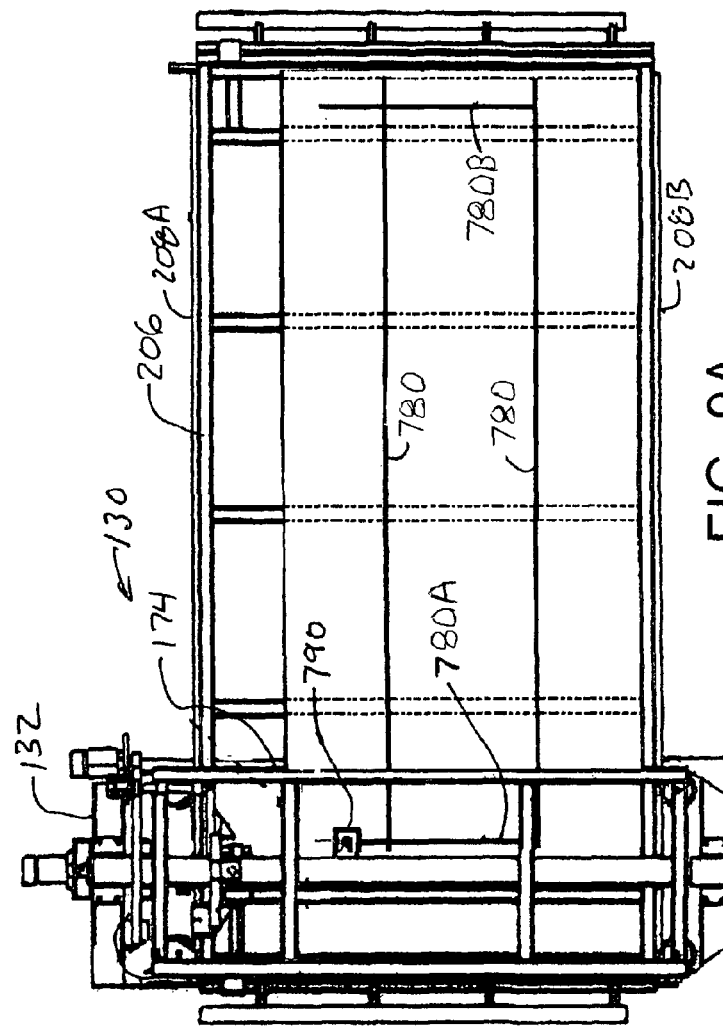

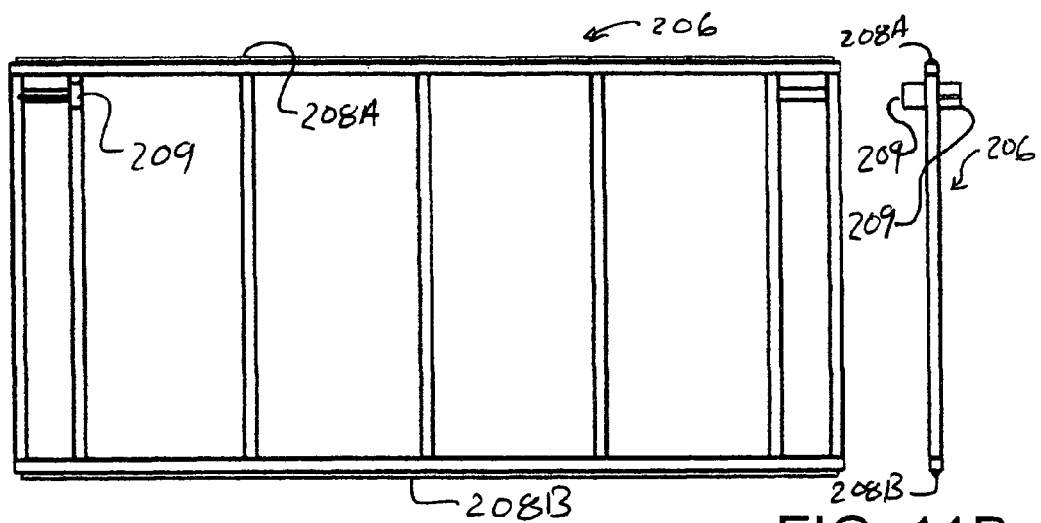
FIG. 11A
FIG. 11B
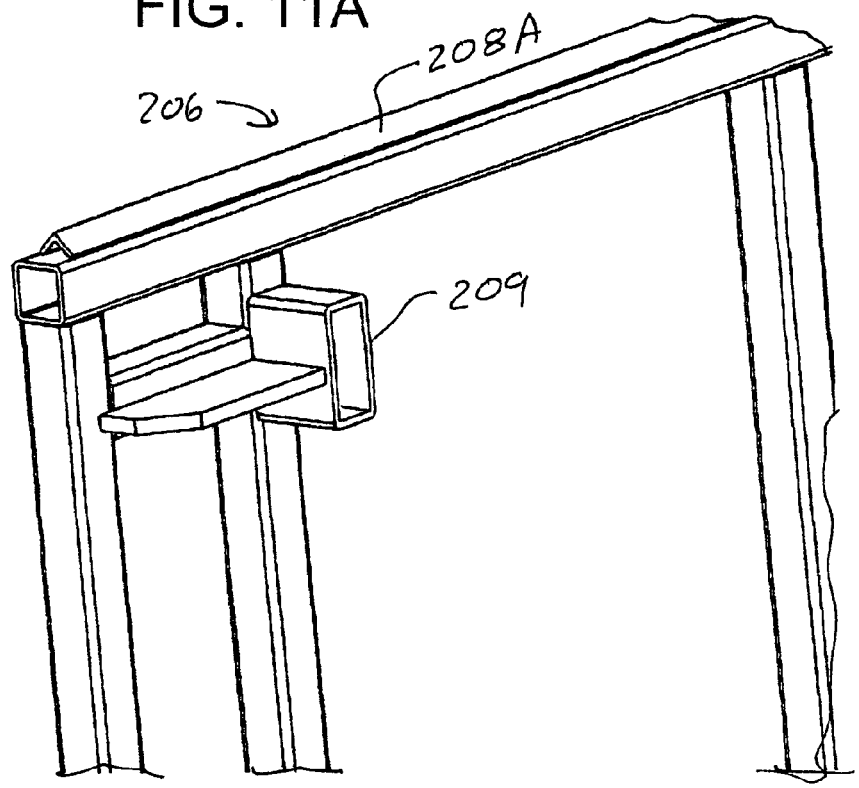
FIG. 11C

LIVESTOCK MOVING SYSTEM AND METHOD

CROSS REFERENCE TO RELATED APPLICATIONS

This application is a continuation of U.S. patent application Ser. No. 11/235,932 filed 27 Sep. 2005 now U.S. Pat. No. 7,900,587, which is incorporated herein by reference.

U.S. patent application Ser. No. 11/235,932 claimed the benefit of U.S. provisional application 60/613,878 filed Sep. 28, 2004.

FIELD OF THE INVENTION

This invention relates to a series of turret mounted rotating and shuttling panels for moving livestock through a series of enclosures.

BACKGROUND

Livestock animals are typically herded through chutes or enclosures using traditional herding or driving techniques. Herding livestock through a chute or enclosure may require the action of a horseback mounted handler or an unmounted handler. In the case of herding large animals such as cattle, there is a danger that a handler may be pressed by livestock against the walls of a chute or an enclosure. This danger is particularly acute in the case of herding large livestock such as cattle. Moreover, livestock typically have a "flight zone" such that when a handler approaches a livestock animal within the animal's flight zone, the animal becomes stressed and may try to evade the handler. Accordingly, a need exists for a remotely system for urging livestock through an enclosed space or chute wherein, contact between livestock animals and handlers is minimized.

SUMMARY

In an embodiment of the present invention the aforementioned need is addressed by a system including a sequence of interconnected enclosures in which the periphery of each enclosure extends generally to the center of the next enclosure. The enclosures include arc shaped walls. When the enclosures are arranged in a series, the enclosures between the first and last enclosures should preferably be semi-circular. In this connection, the center of a semi-circle or an arc should be understood as the center of curvature. At the center of each enclosure is a turret unit including a support frame, a turret frame and a panel. The support frame is stationary and the turret frame is rotatably mounted to the support frame. The panel is mounted to the turret frame such that when the turret frame rotates the panel sweeps around the enclosure. The panel is also mounted to the turret frame so that the panel may be shuttled to the opposite side of the turret frame and thus to the opposite side of the turret unit. Panels can thus be alternately swept around their respective enclosures and shuttled across from one side of their supporting turret units to the other side and thus shuttled between opposite sides of their respective enclosures in order to present translating enclosed areas for livestock as the livestock progress through a series of interconnected semicircular enclosures.

BRIEF DESCRIPTION OF THE DRAWINGS

FIG. 9A is a plan view of an automatic turret unit.

FIG. 9B is a top view of an automatic turret unit.

FIG. 11A is a plan view of a panel of an automatic turret unit.

FIG. 11B is an end view of a panel of an automatic turret unit.

FIG. 11C is a perspective view of the upper portion of one end of a panel of an automatic turret unit.

DETAILED DESCRIPTION

Figure 1:
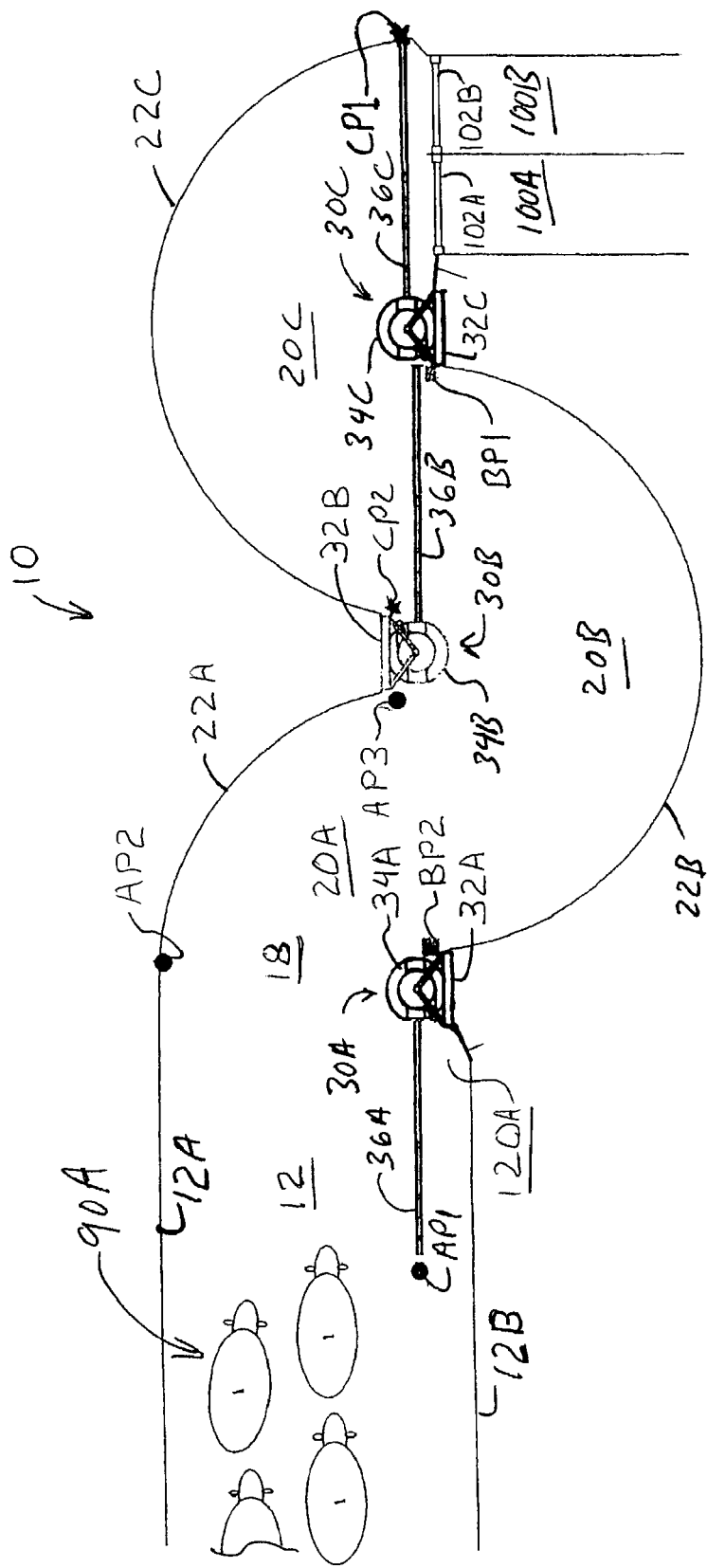
FIG. 1 is a first top view of a turret system including three turret units and three overlapping enclosures.

Referring to the drawings, FIG. 1 illustrates a livestock moving system 10. Generally, livestock moving system 10 includes an entrance passageway 18, enclosure 20A and semicircular enclosures 20B and 20C, turret units 30A, 30B, and 30C and exit chutes 100A and 100B. Entrance passageway 18 communicates between alleyway 12 and enclosure 20A and is bounded by opposite alley walls 12A and 12B. Enclosure 20A is defined by wall 12A and arc shaped quarter-circular wall 22A. Enclosures 20B and 20C are defined by semi-circular walls 22B and 22C respectively. Turret units 30A, 30B, and 30C may be substantially identical and interchangeable. Accordingly, turret unit 30A includes a support frame 32A, a turret frame 34A and a panel 36A. Turret unit 30B includes a support frame 32B, a turret frame 34B and a panel 36B and turret unit 30C includes a turret frame 34C and a panel 36C.

Operation of One Turret Unit within an Enclosure

Livestock moving system 10 can be best understood by examining one of the three substantially identical turret units shown in FIGS. 1-8 and more particularly, turret unit 30B which is associated with semicircular enclosure 20B. As noted above, turret unit 30B includes support frame 32B, turret frame 34B and panel 36B. Turret unit 30B like turret units 30A and 30C is designed to move panel 36B in two modes of movement: a sweep mode and a shuttle mode. During the sweep mode of movement, turret frame 34B rotates with respect to support frame 32B such that panel 36B sweeps around semicircular enclosure 20B. During the shuttle mode of movement, panel 36B translates through turret frame 34B as turret frame 34B remains stationary with respect to support frame 32 such that panel 36B shuttles to the other side of turret frame 34B.

Figure 5:
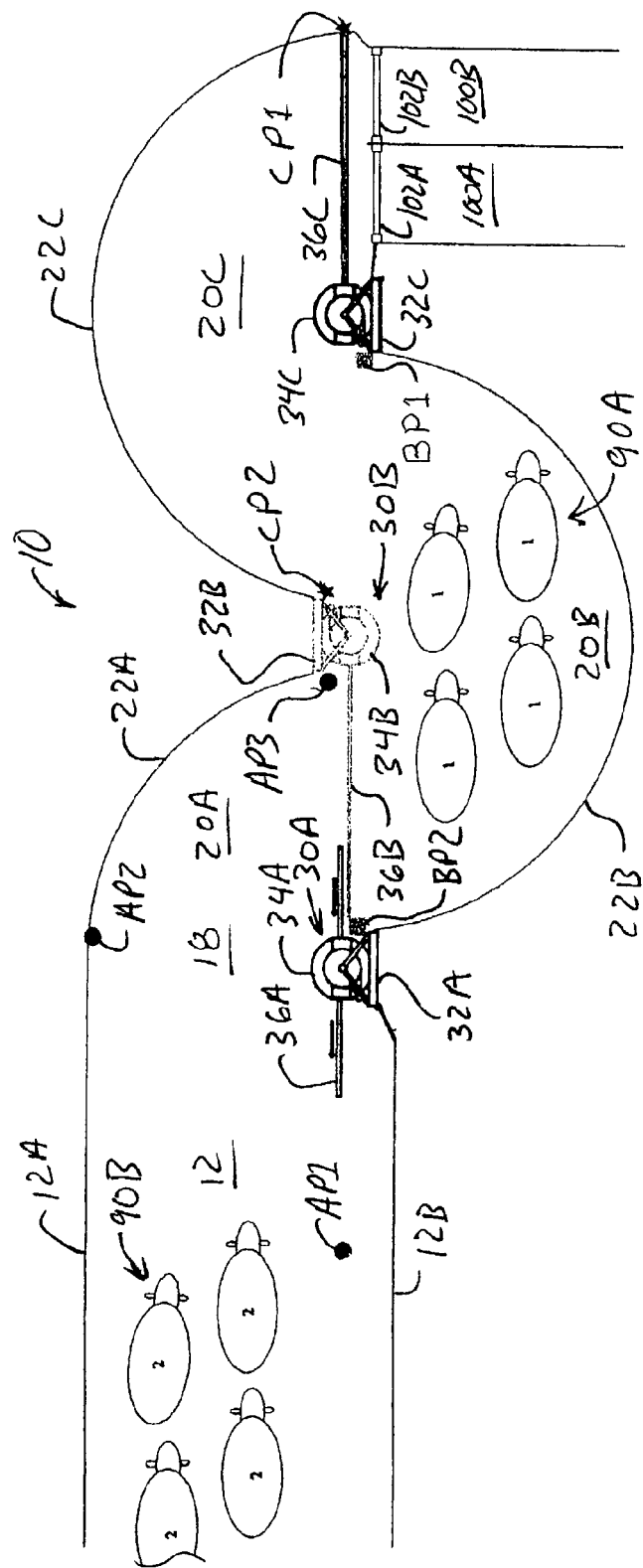
FIG. 5 is a fifth top view of a turret system including three turret units and three overlapping enclosures.
Figure 6:
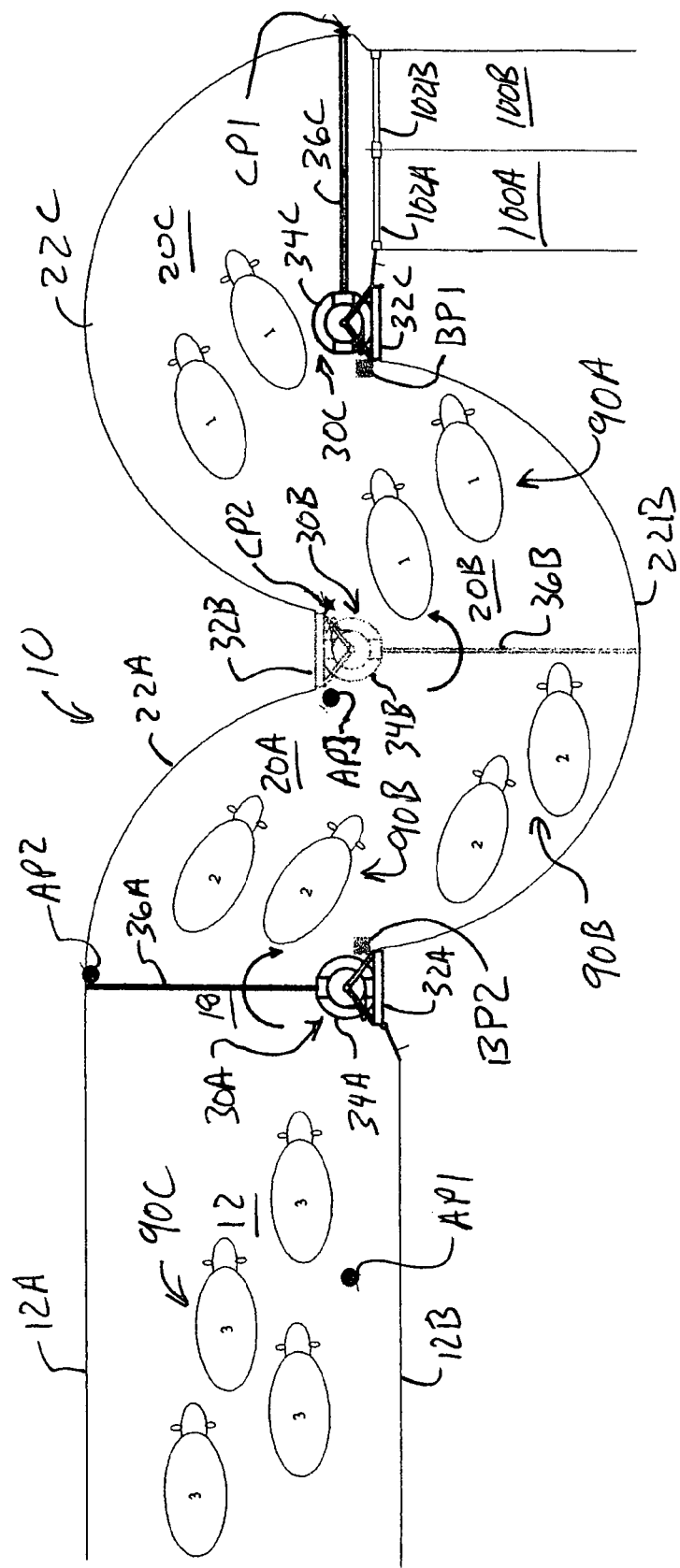
FIG. 6 is a sixth top view of a turret system including three turret units and three overlapping enclosures.
Figure 7:
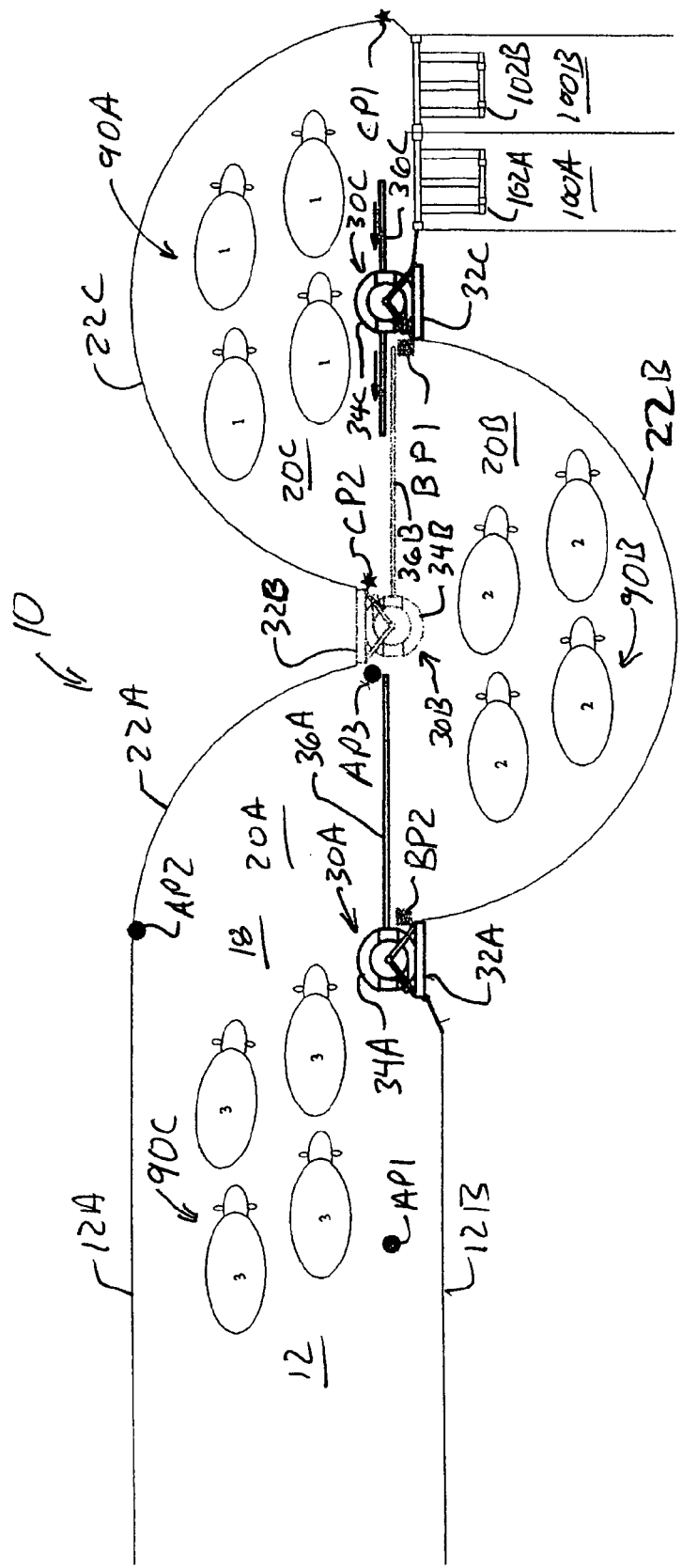
FIG. 7 is a seventh top view of a turret system including three turret units and three overlapping enclosures.

The sweep mode of movement for turret unit 30B is best understood by referring to FIGS. 5-7. In FIG. 5, prior to sweeping, panel 36B is fully extended so that its distal end is proximate to semi-circular wall 22B at point BP2. FIG. 6 shows the rotation of turret frame 34B as panel 36B sweeps from the position shown in FIG. 5 to the position shown in FIG. 7. In FIG. 7, after panel 36B has swept through enclosure 20B, the distal end of panel 36 is at point BP1.

Figure 3:
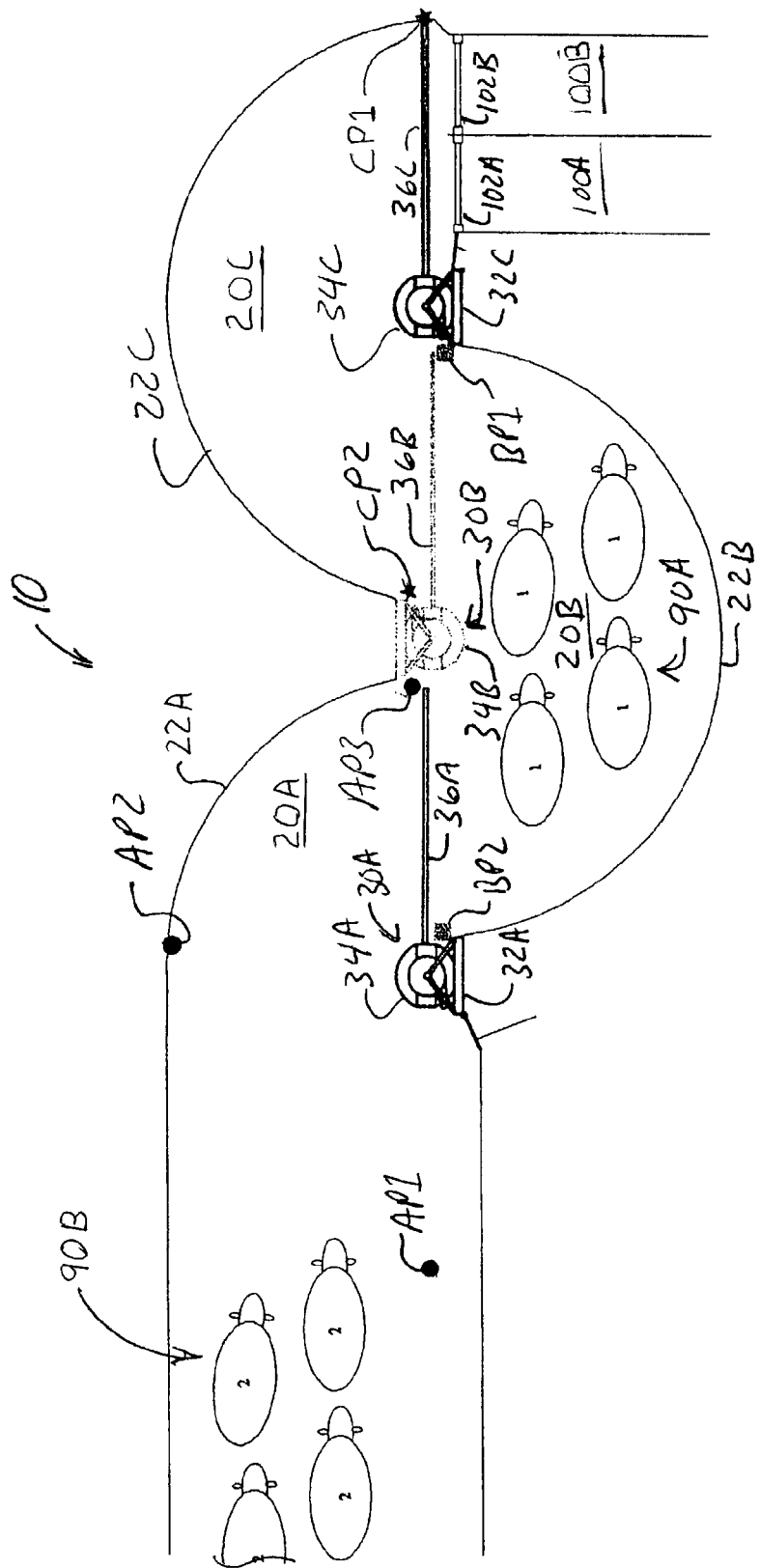
FIG. 3 is a third top view of a turret system including three turret units and three overlapping enclosures.
Figure 4:
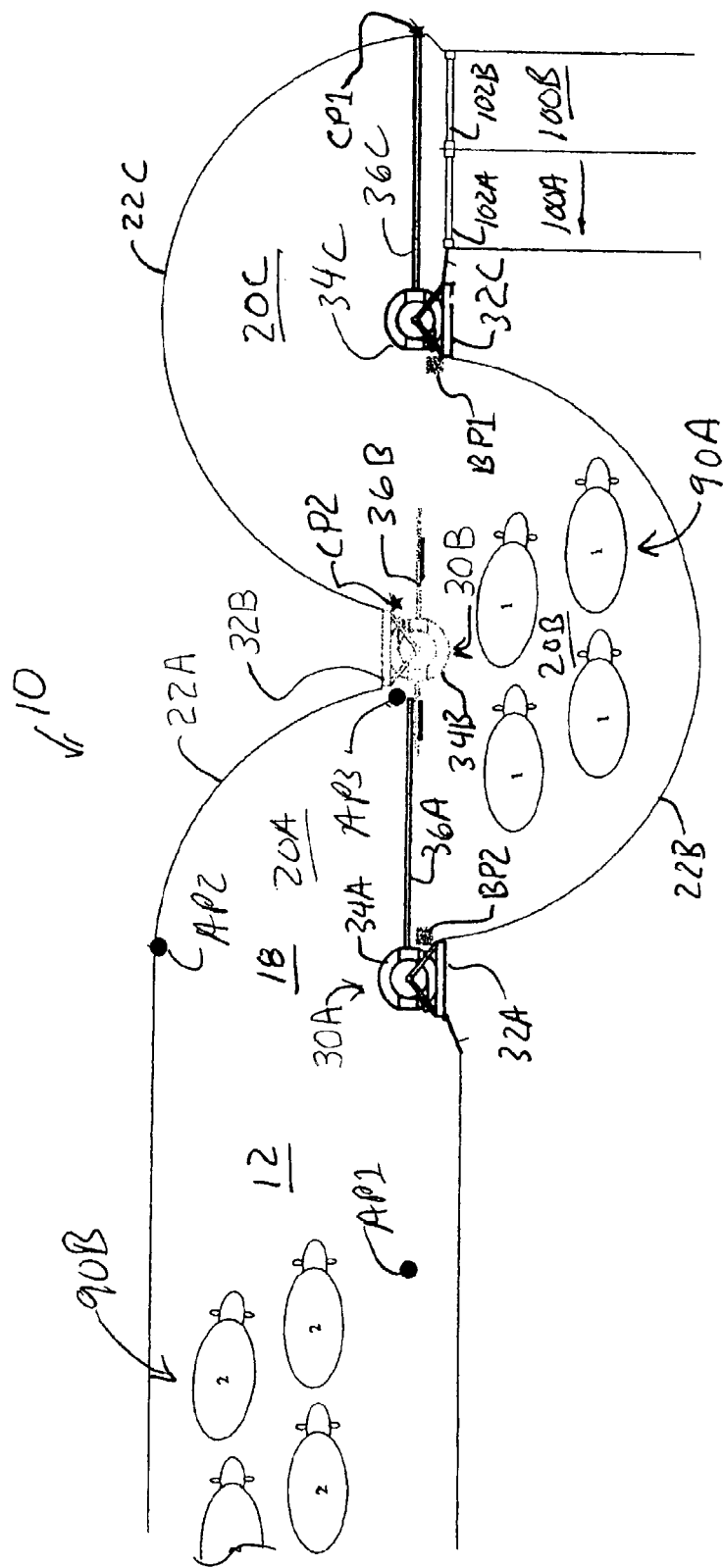
FIG. 4 is a fourth top view of a turret system including three turret units and three overlapping enclosures.

The shuttle mode of movement for turret unit 30B is best understood by referring to FIGS. 3-5. In FIG. 3, prior to shuttling, panel 36B is fully extended to the right so that the right distal end of panel 36B is at point BP1. FIG. 4 shows the translation of panel 36B as it shuttles through turret frame 34B from the position shown in FIG. 3 to the position shown in FIG. 5. In FIG. 5, the end of panel 36B which was proximate to turret frame 34B is now extended away from turret frame 34B in proximity to point BP2.

Method for Operating a Series of Turret Units

Having thus described the actions of one turret unit as it either sweeps a panel around a semicircular enclosure or shuttles a panel across an enclosure, it is now possible to consider an arrangement of a series of enclosures and turret units. It is also possible to consider a sequence of operations—or a method—for moving livestock through a series of semicircular enclosures.

The coordinated actions of three turret units are illustrated in FIGS. 1-8. In FIG. 1, a first group of livestock animals 90A is passing through alley 12 and approaching entrance passageway 18. In FIG. 1, turret 30A is set so that panel 36A is extended toward point AP1, turret 30B is set so that panel 36B is extended toward point BP1 and turret 30C is set so that panel 36C is extended toward point CP1. This configuration presents an open passage for first group of livestock animals 90A to enter enclosures 20A and 20B.

Figure 2:
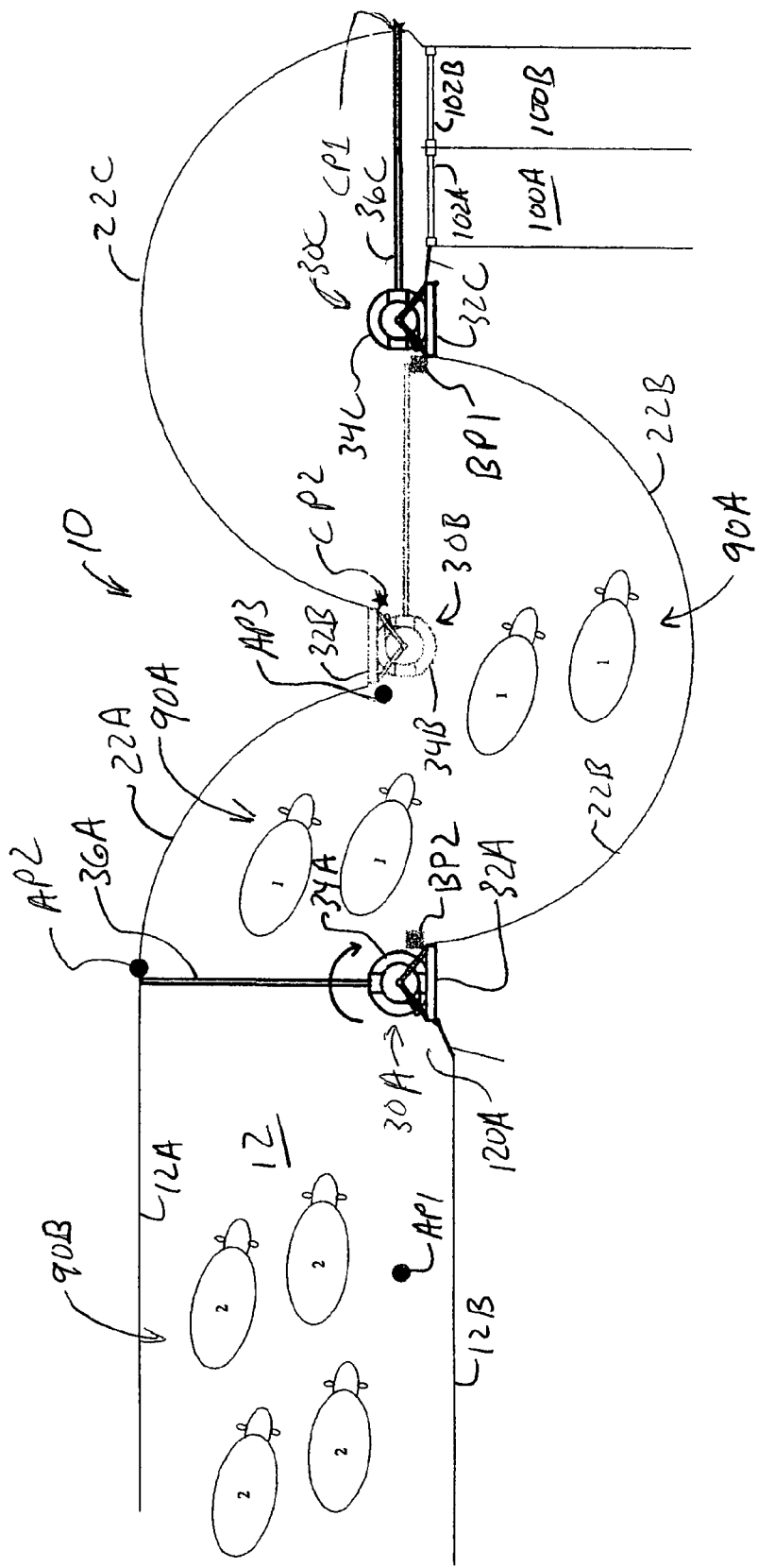
FIG. 2 is a second top view of a turret system including three turret units and three overlapping enclosures.

In FIG. 2, first group of livestock animals 90A has entered enclosures 20A and 20B and panel 36A has rotated to point AP2 thus separating group 90A from alley 12. A second group of livestock animals 90B is in alley 12 and is approaching entrance passageway 18.

In FIG. 3, first group of livestock animals 90A is herded into enclosure 20B as panel 36A of turret unit 30A sweeps to point AP3. In FIG. 3, panels 36A and 36B isolate group 90A in enclosure 20B. In FIG. 4, panel 36B shuttles from point BP1 to point BP2 thus opening communication between enclosures 20B and 20C. In FIG. 5, panel 36B is completely shuttled to point BP2 thus presenting an open passageway for group 90A to pass into enclosure 20C. Also in FIG. 5, panel 36A shuttles from point AP3 to AP1 in preparation for urging group 90B into enclosure 20A. Also in FIG. 5, a third group of livestock animals 90C approaches in alley 12.

In FIG. 6, the system is now managing the movement of three groups of livestock animals 90A, 90B and 90C. First group of livestock animals 90A is herded from enclosure 20B to enclosure 20C as panel 36B of turret unit 30B sweeps from point BP2 to point BP1. As group 90A is herded from enclosure 20B to 20C, second group 90B is herded from enclosure 20A to enclosure 20B as panel 36A sweeps from point AP2 to point AP3. As panel 36A sweeps from point AP2 to point AP3 passageway 18 is opened for group 90C.

In FIG. 7 panel 36A has swept to point AP3, panel 36B has swept to point BP1 and panel 36C is shuttling from point CP1 to point CP2 in order to open communication between enclosure 20C and exit chutes 100A and 100B.

Figure 8:
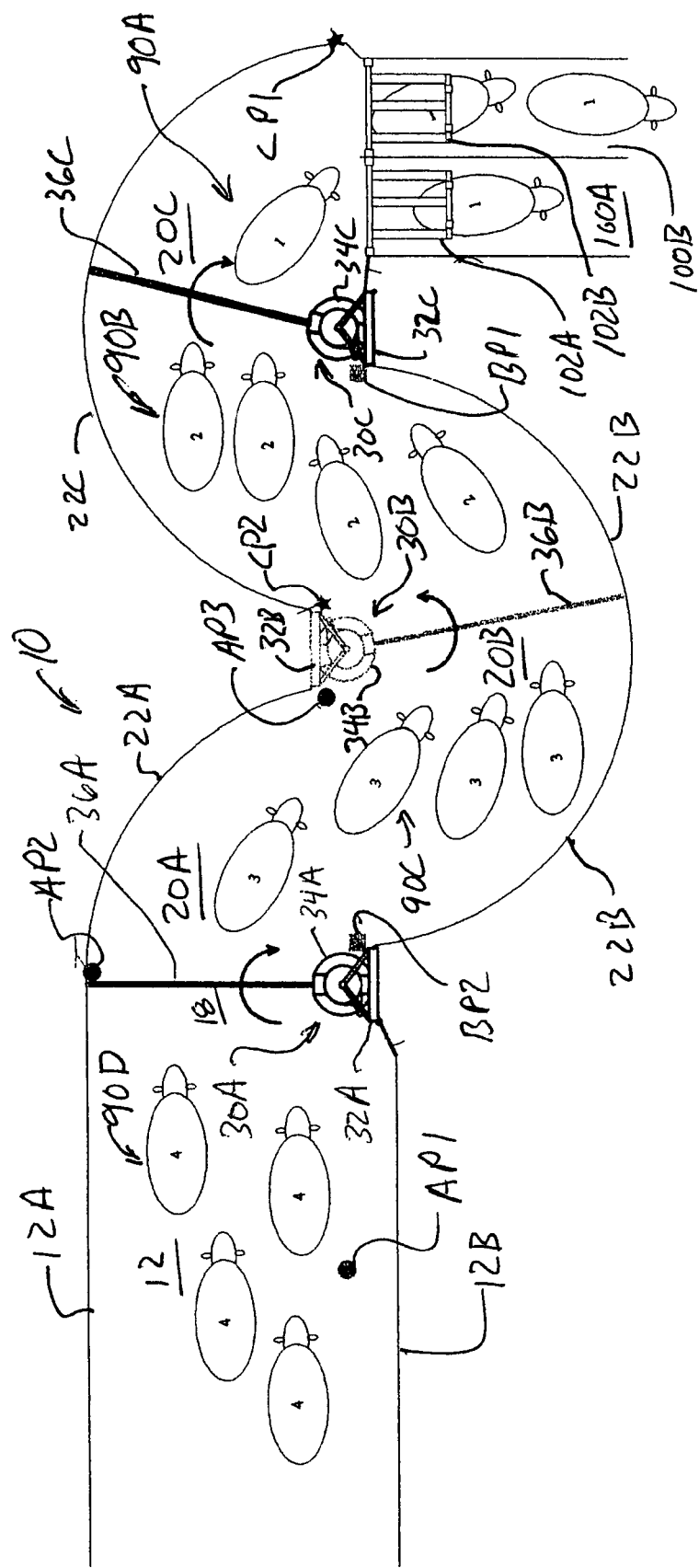
FIG. 8 is a eighth top view of a turret system including three turret units and three overlapping enclosures.

In FIG. 8, a fourth group of livestock animals 90D has moved into alleyway 12. As can be seen in FIG. 8, panels 36A and 36C are sweeping in a clockwise direction while panel 36B is sweeping in a counter clockwise direction in order to move groups 90A, 90B and 90C toward their eventual egress into exit chutes 100A and 100B. In FIG. 8, group 90A is urged through a pair of one-way folding gates 102A and 102B into exit chutes 100A and 100B by the panel 36C as it sweeps through enclosure 20C. Folding gates 102A and 102B are presented here by way of example and may be replaced by one or more of a variety of exit chutes. At the same time, in FIG. 8, group 90B is herded by sweeping panel 36B from enclosure 20B to enclosure 20C. Still further, at the same time in FIG. 8, group 90C is herded from enclosure 20A to enclosure 20B by the sweeping action of panel 36A. When panels 36A, 36B and 36C have completed their sweeps, group 90A will be in exit chutes 100A and 1001B, group 90B will be in enclosure 20C and group 90C is in enclosure 20B. At this point, panels 36A, 36B and 36C may be shuttled to the left in preparation for subsequent sweeping movements for herding groups 90B, 90C, 90D and a subsequent group of livestock animals substantially as described above.

The operation of turret units 30A, 30B and 30C may be partially manual or almost completely automated. As can be seen in FIG. 1, the shuttling of panels 36A and 36C may be conducted manually. For manual operations, handlers must be able to access panel 36A though a first gate 110A and access panel 36C through a second gate 110C. It is preferable that turret unit 30A is located so that panel 36A can not be pushed into contact with the wall of alleyway 12 adjacent to turret unit 30A. In the same way, it is preferable that turret unit 30C be located so that panel 36C cannot make contact with second gate 110C. This provides protected spaces for livestock handlers. Serious injuries and even fatalities have been known to occur when handlers are trapped between enclosure walls and gates or panels which are being pushed by large livestock. A livestock handler positioned at location 120A or location 120C will be protected by the limited movement of panel 36A or panel 36C respectively.

Detailed Description of an Automated Turret Unit

FIGS. 9A-15B provide detailed illustrations of an automated turret unit 130. Automated turret unit 130 is intended as an example embodiment of a turret unit which may be used for turret units 30A, 30B and 30C referred to above. Automated turret unit 130 is designed to provide a remotely operable turret unit which is able to shuttle or sweep a panel as described above without the manual intervention of an operator or livestock handler. This provides the important advantage of isolating handlers and operators from livestock thus reducing the stress experienced by livestock and reducing the risk of injury to livestock handlers and system operators. As shown in FIGS. 9A and 9B, automated turret unit 130 includes a support frame 132, a turret frame 174 and a panel 206. Turret frame 174 is pivotably mounted to support frame 132 for sweeping panel 206 from the position shown. Turret frame 174 also receives panel 206 on rollers which will be described below so that panel 206 may shuttle through turret frame 174.

Figure 10:
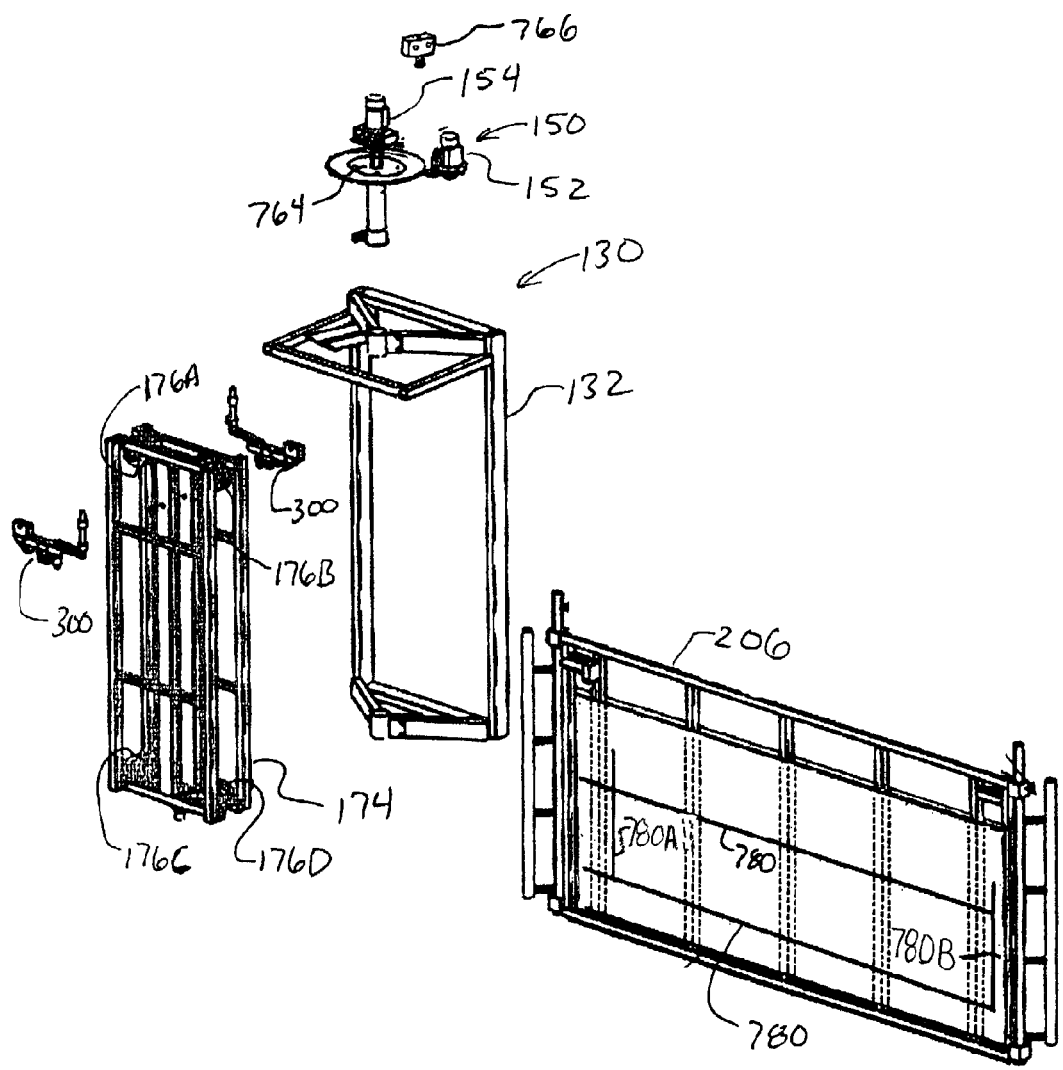
FIG. 10 is an exploded perspective view of an automatic turret unit.

FIG. 10 provides an exploded perspective view of turret unit 130. FIG. 9A provides a plan view of an assembled turret unit 130 and FIG. 9B provides a top view of assembled turret unit 130. In FIG. 10, a power unit 150 is illustrated in an exploded manner. Power unit 150 mechanically couples between support frame 132 and turret frame 174. Power unit 150 includes a sweep hydraulic motor 152 for powering the rotation of turret frame 174 in relation to support frame 132 for sweeping panel 206 and a shuttle hydraulic motor 154 for spooling a cable (not shown) which actuates shuttling movements of panel 206 through turret frame 174.

FIG. 10 also provides exploded illustrations of latch assemblies 300. Latch assemblies 300 are generally identical assemblies which are mounted in an opposite, symmetrical fashion to turret frame 174. Latch assemblies 300 are designed to lock panel 206 to prevent shuttling movements of panel 206 when panel 206 is sweeping. Latch assemblies 300 are also designed to release panel 206 to allow the shuttling of panel 206 when panel 206 is in a predetermined position for shuttling. The operations of power unit 150 and latch assemblies 300 will be described in greater detail below.

FIGS. 9A-10, FIG. 14 and FIG. 15A also illustrate components of an electrical stimulation system 760 for urging livestock away from panel 206. Because panel 206 when sweeping my not have sufficient leverage to push large livestock, it is preferable to have a system for urging animals away from panel 206. As can be seen in FIGS. 9A and 10, each side of panel 206 presents a pattern of electrically conductive elements including generally horizontal elements 780 and generally vertical elements 780A and 780B. Generally vertical elements 780A and 780B at located at opposite ends of panel 206. Elements 780, 780A and 780B on both sides of panel 206 are connected to each other preferably by at least one conductive metal bolt in order to present a single conductive pattern. Elements 780 are positioned for making contact with livestock for urging livestock forward. The electric power supplied to elements 780, 780A and 780B is preferably between 7 and 11 joules for beef cattle. The use of electric current to urge livestock animals away from barriers such as fences is well known in the art. Electrical stimulation system 760 may be associated with the drive mechanism for rotating turret frame 132 such that when turret frame 132 is prevented from rotating during a sweep, electrical stimulation system 760 is activated. A means for activating stimulation system 760 in response to turret frame 132 stalling will be described in greater detail below.

Figure 14:
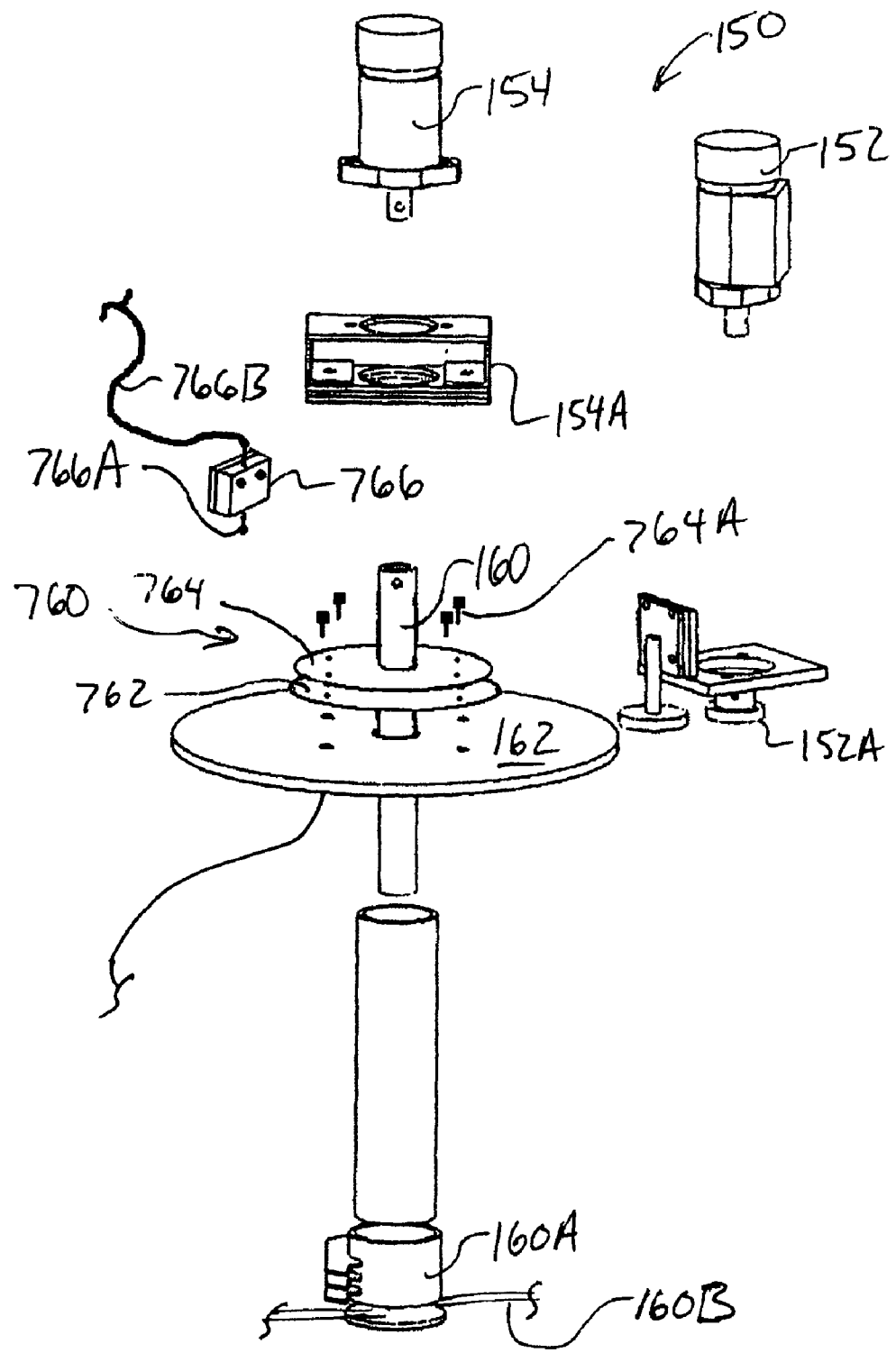
FIG. 14 is an exploded perspective view of a power assembly of an automatic turret unit.

Electrical stimulation system 760 also includes elements for delivering current to elements 780, 780A and 780B of panel 206. A contact unit 790 is mounted turret frame 174. Contact unit 790 includes a biased contact that follows the surface of panel 206 and makes electrical contact with element 780A or 780B when panel 206 is at either end of its transverse travel. A second arrangement is used to transfer electrical current between an electrical power supply mounted on generally stationary support frame 132 and contact unit 790 mounted on rotating turret frame 174. This arrangement can be best seen in FIG. 14. In FIG. 14, an electrified contact unit 766 includes a spring biased conductive contact 766A which communicates with power supply wire 766B. An insulating plate 762 and a conductive plate 764 are bolted to belt plate 162 by insulated bolts 764A such that insulating plate 762 electrically isolates conductive plate 764 from belt plate 162 and from any other conductive portion of power unit 150 and turret frame 174. Conductive contact 766A is positioned to ride upon conductive plate 764. At least one of insulated bolts 764A while insulating conductive plate 764 from belt plate 162 provides a conductive path from conductive plate 764 to contact unit 790. Thus a path for communicating electric current is provided between a power supply connected to power supply wire 766B, across the rotating structure of turret frame 174 to conductive elements 780, 780A and 780B of panel 206.

Figure 13:
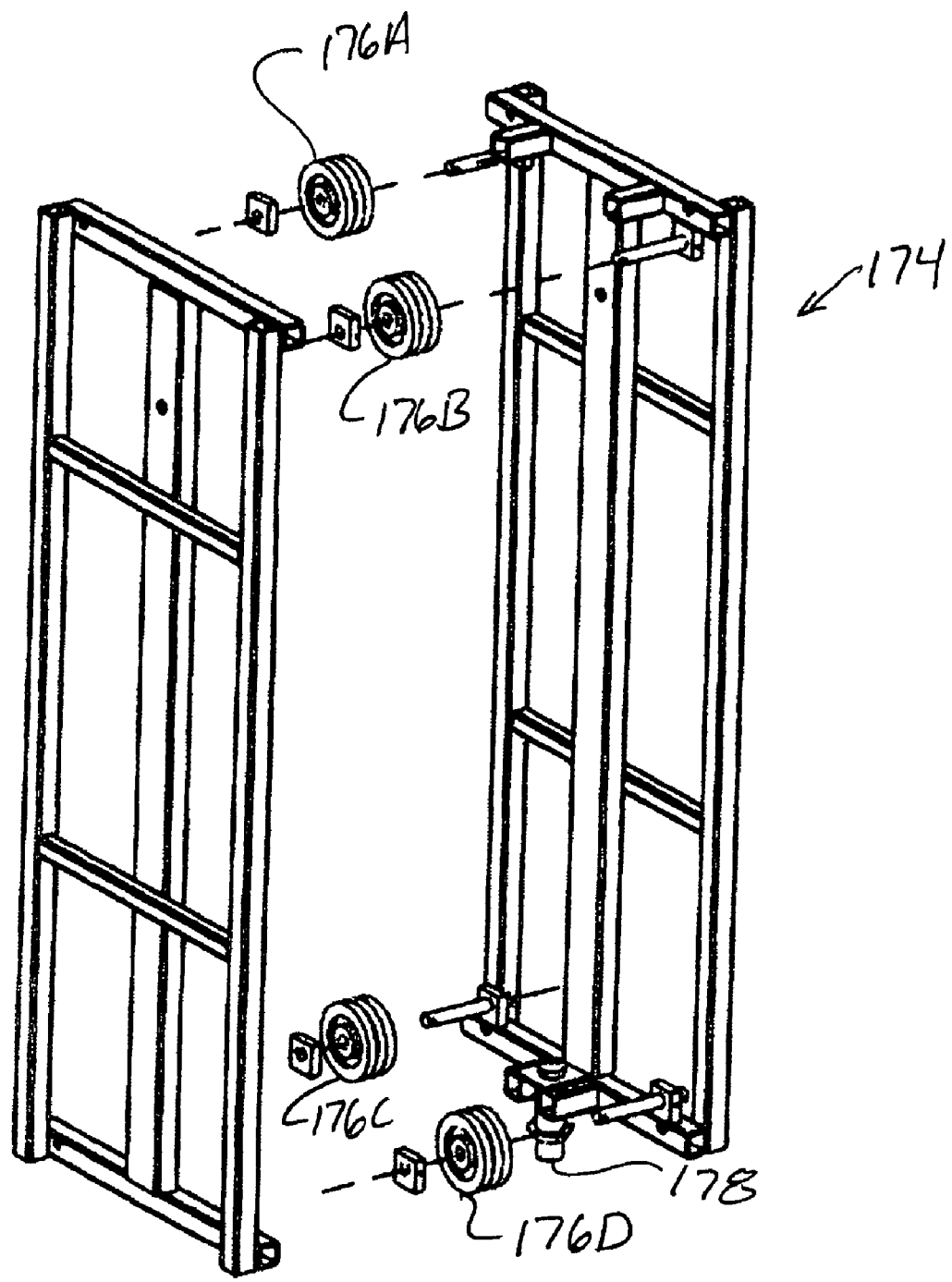
FIG. 13 is an exploded perspective view of a turret frame of a turret unit.

FIGS. 11A, 11B and 11C provide detailed views of panel 206. Since panel 206 is swept and shuttled within a generally symmetrical mechanism, panel 206 is generally symmetrical about its center. An exploded detailed view of turret frame 174 is provided in FIG. 13. FIG. 13 shows that a set of rollers 176A, 176B, 176C and 176D are mounted to turret frame 174. As can be seen in FIGS. 10 and 13, rollers 176A, 176B, 176C and 176D are shaped and positioned to receive panel 206. Each of rollers 176A, 176B, 176C and 176D preferably includes a circumferencial groove for receiving panel 206. Accordingly, as can be seen in FIGS. 11A, 11B and 11C, panel 206 includes rail members 208A and 208B each having a "v" shaped profile corresponding to the circumferencial grooves of rollers 176A, 176B, 176C and 176D. Although, in this embodiment rollers 176A, 176B, 176C and 176D and rail members 208A and 208B have corresponding grooves and "v" shaped profiles, other corresponding geometries may be selected to guide panel 206 in relation to rollers 176A, 176B, 176C and 176D. Rollers 176A, 176B, 176C and 176D are mounted by ball bearings to turret frame 174 so that panel 206 may shuttle through turret frame 174 with a minimum of friction. Panel 208 also includes a pair of opposite, symmetrical boss members 209. The function of these boss members will be described below.

Figure 12C:
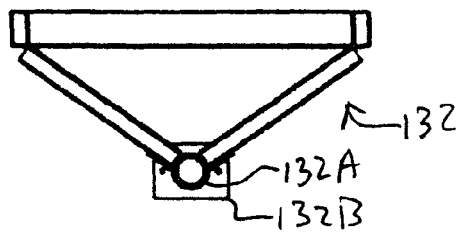
FIG. 12C is a top view of a support frame of an automatic turret unit.
Figure 12B:
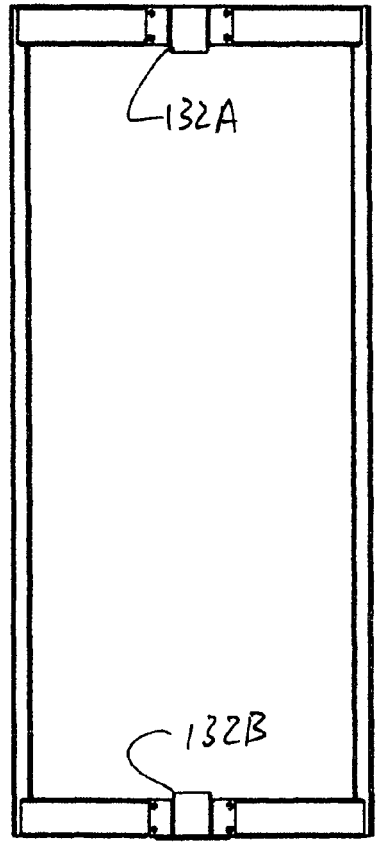
FIG. 12B is a plan view of a support frame of an automatic turret unit.
Figure 12A:
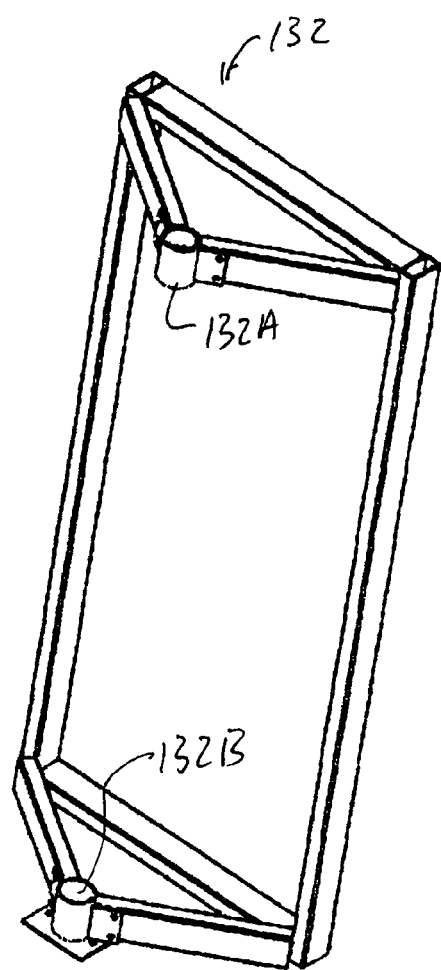
FIG. 12A is a perspective view of a support frame of an automatic turret unit.

FIGS. 12A-12C provide detailed views of support frame 132 which should be considered with the detailed exploded view of turret frame 174 shown in FIG. 13 and the detailed exploded view of power unit 150 shown in FIG. 14. FIGS. 12A-12B show that support frame 132 includes axially aligned bearings 132A and 132B. As seen in FIG. 13, turret frame 174 includes a bearing shaft 178 which is received by bearing 132B of support frame 132. Bearing 132A is designed to receive and support drive power unit 150 shown in FIG. 14.

Figure 15A:
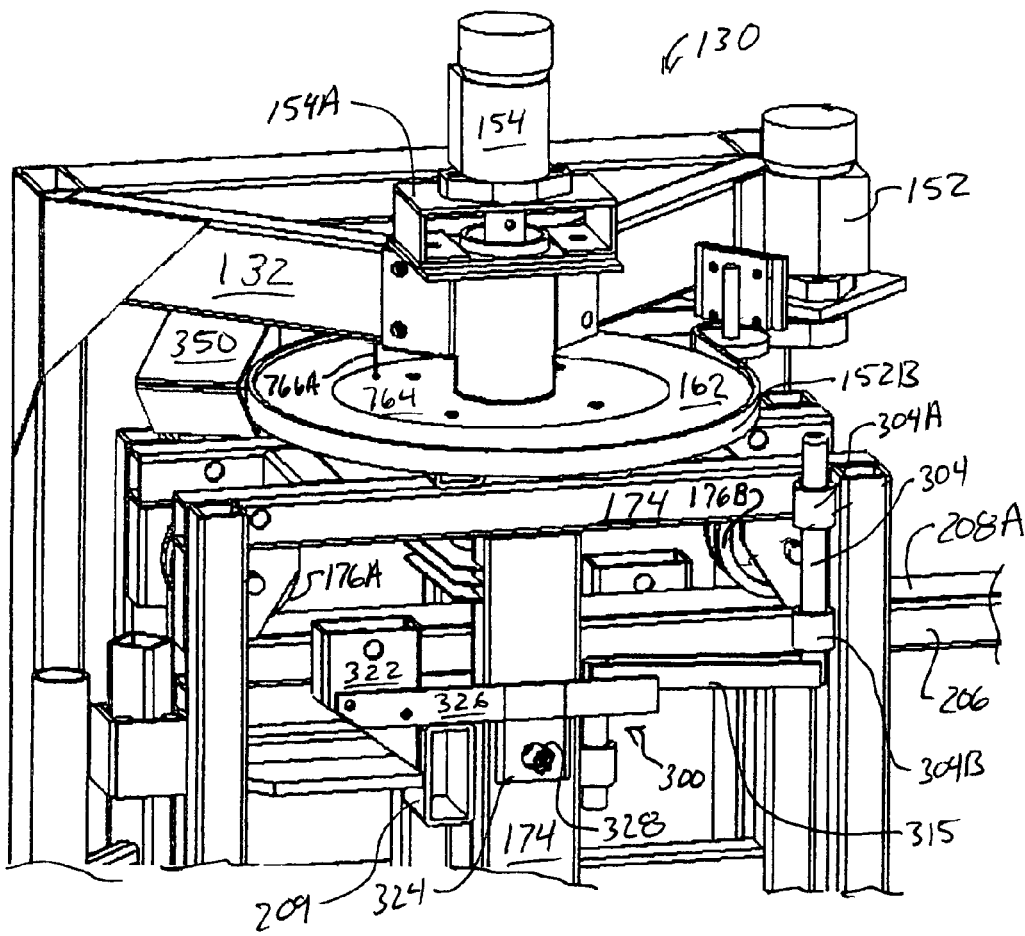
FIG. 15A is a perspective view of the upper portion of an automatic turret unit.

FIG. 14 provides an exploded perspective view of drive unit 150. FIG. 15A illustrates drive unit 150 installed within turret unit 130. Drive unit 150 operatively associates with support frame 132, turret frame 174 and panel 206. Drive unit 150 includes sweep hydraulic motor 152 and shuttle hydraulic motor 154. As is shown in FIG. 15A, both sweep hydraulic motor 152 and shuttle hydraulic motor 154 are fixed to support frame 132. Sweep hydraulic motor 152 is bolted directly to support frame 132. Shuttle hydraulic motor 154 is mounted to support frame 132 by a mounting bracket 154A. Shuttle hydraulic motor 154 is operatively connected to a spool shaft 160 which in turn is fixed to a spool 160A. Spool 160A carries a spool cable 160B. The opposite ends of cable 160B are connected to corresponding opposite ends of panel 206. As shuttle hydraulic motor 154 rotates, spool 160A rotates and causes cable 160B to retract on one side and play out on the opposite side thus causing panel 206 to shuttle through turret frame 174. Sweep hydraulic motor 152 operates a belt pulley 152A. A belt plate 162 is fixed to turret frame 174 as shown in FIG. 15A. As is shown in FIG. 15A, a belt 152B communicates between belt pulley 152A and belt plate 162. Accordingly, a sweep hydraulic motor 152 rotates belt pulley 152A, belt plate 162 and turret frame 174 rotate as panel 206 sweeps. The belt and pulley arrangements described above may also be replaced by another drive means such as, for example, a chain and sprocket arrangement.

Numerous systems may be employed to control the operation of hydraulic motors 152 and 154. Generally, it is important that relief valves be included in the hydraulic circuits servicing hydraulic motors 152 and 154 so that the hydraulic system is not overloaded and so that animals and handlers are not injured by equipment that applies excessive forces. An example control system for hydraulic motors 152 and 154 is presented in FIGS. 14A and 14B.

Figure 14A:
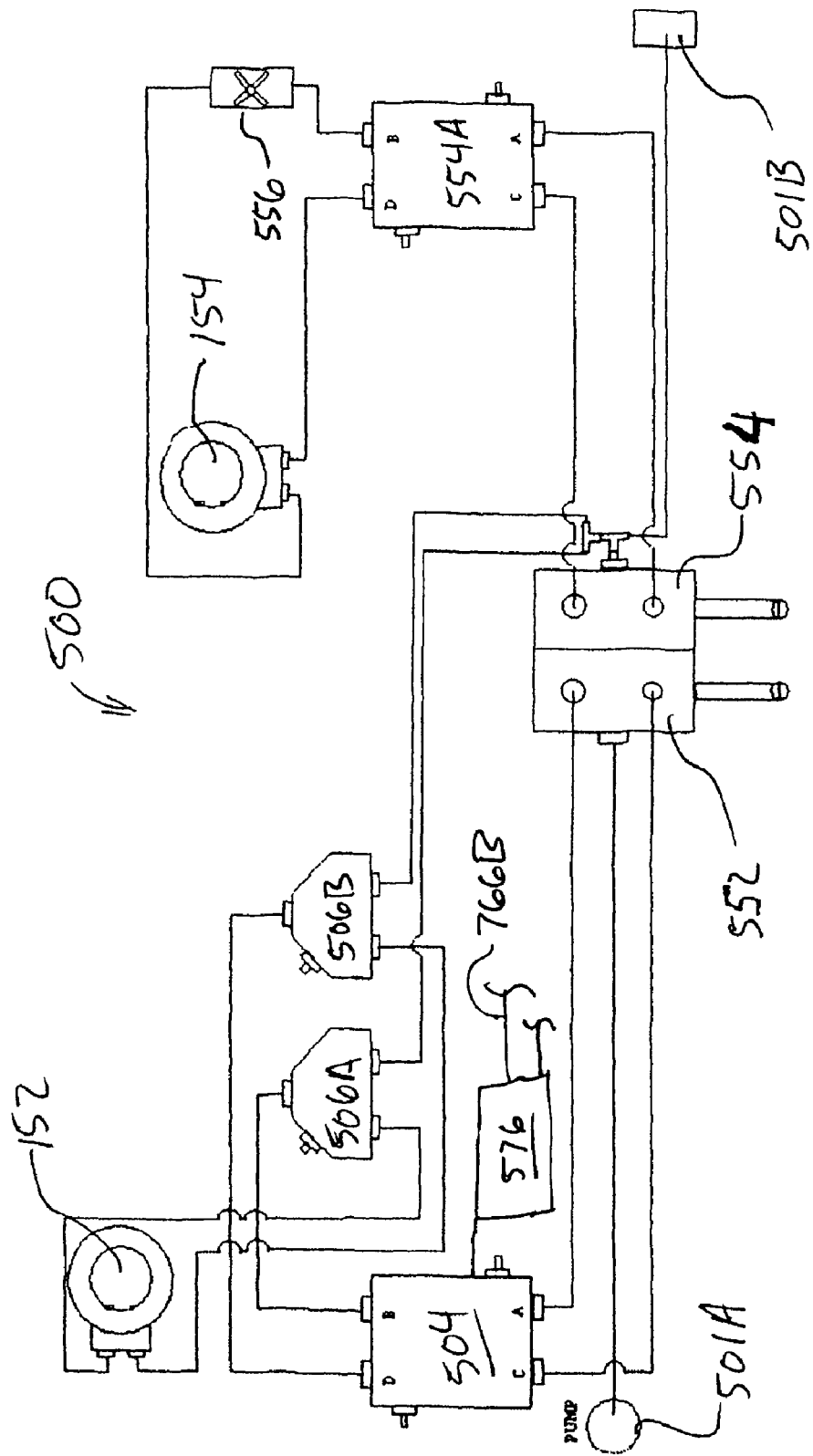
FIG. 14A is a diagram of the hydraulic system for a turret unit.

FIG. 14A provides a schematic for a hydraulic system 500 for operating sweep hydraulic motor 152 and shuttle hydraulic motor 154. Hydraulic system 500 includes a pump 501A, a reservoir 501B, a sweep motor control valve 552 and a shuttle motor control valve 554. Sweep motor control valve 552 is connected with sweep hydraulic motor 152 in a circuit including a dual relief valve 504 and adjustable flow dividers 506A and 506B. Sweep motor control valve 554 and shuttle hydraulic motor 154 are connected in a circuit with dual relief valve 554A and flow control valve 556. In this system, pressure relief valves 504, 554A and flow control valve 556 are adjustable. This adjustability allows the panel sweeping and shuttling to be set to operate within pre-selected speed and force ranges. The relief valves are preferably set to cause motors 152 and 154 to be bypassed when large forces are encountered.

Relief valve 504 shown in FIG. 14A may be connected to an electrical stimulation relay unit 576 if an electrical stimulation system 760 is used. Relay unit 576 is interfaced with relief valve 504 and electrical stimulation power supply line 766B (also shown in FIG. 14). Relay unit 576 preferably includes a relay which is associated with a timer. The relay of relay unit 576 responds to the opening of relief valve 504 by dwelling for the dwell time and then closing power supply line 766B. Typically, the dwell time may be between 0.5 and 2.5 seconds. When the relay closes, power supply line 766B is closed or connected in order to provide power to the electrical stimulation system. As is explained above, relief valve 504 opens when sweep motor 152 is stalled. This would typically occur when a livestock animal is pushing against panel 206. The supply of electrical stimulation current to electrical stimulation system 760 would cause the animal to move away from panel 206. The dwell time gives the animal an opportunity to move away from panel 206 prior to initiation of the stimulation current. When the animal moves away from panel 206, panel 206 is free to continue sweeping. This allows sweep motor 152 to continue turning thus causes relief valve 504 to close. Relay unit 564 should be adapted such that its relay opens when relief valve 504 closes so that power is not supplied through line 766B when sweep motor 152 is operating normally during a sweep cycle. Since relief valve 504 would be closed when sweep motor 152 is not supplied with hydraulic fluid for a sweep cycle, relay unit 576 would operate to supply current to electrical stimulation system 760 during the limited case when a sweep cycle is in progress and when panel 206 is constrained from rotation by a livestock animal.

Figure 14B:
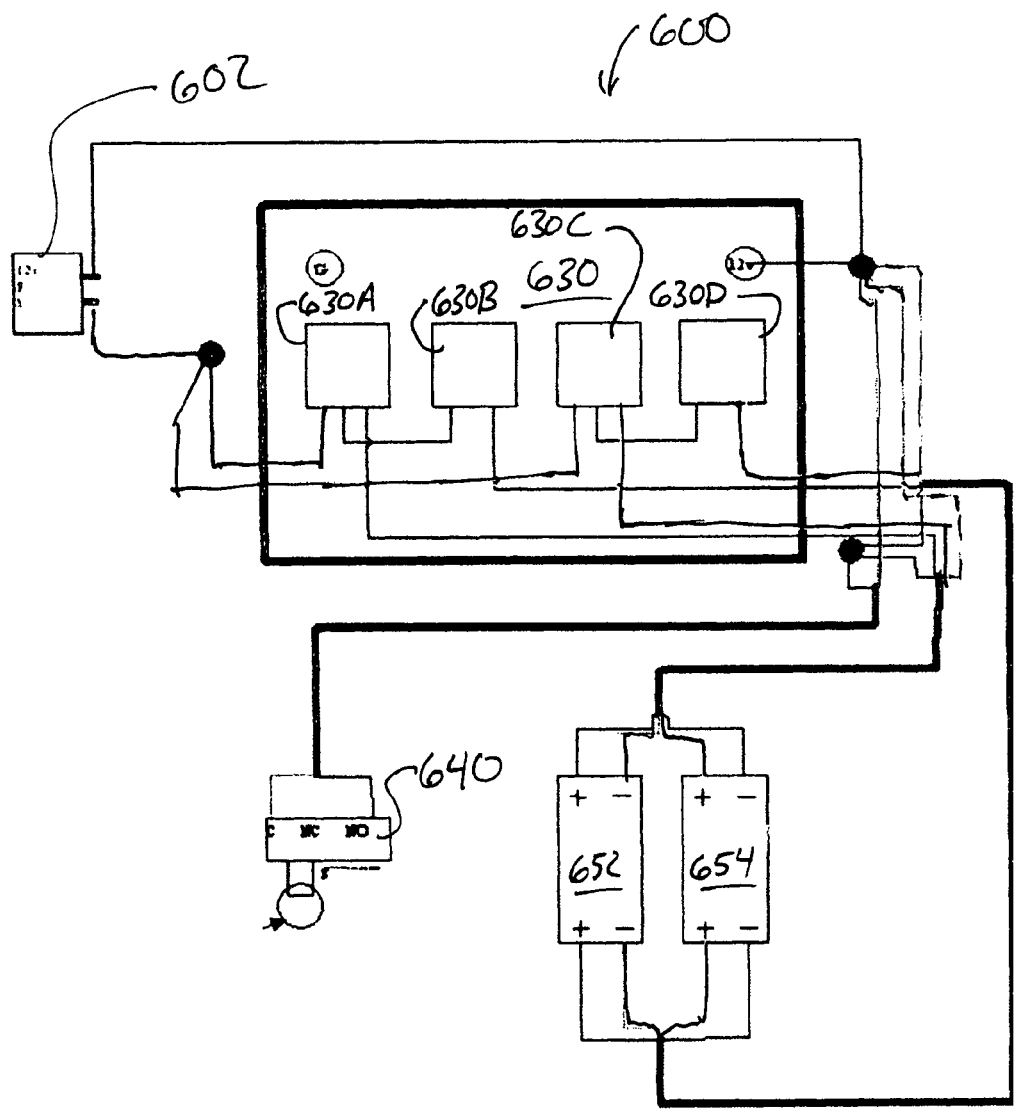
FIG. 14B is a diagram of the electrical control system for controlling the hydraulic system of a turret unit.

FIG. 14B provides a schematic for a remote control system 600 for controlling the operations of valves 552 and 554 of FIG. 14A. Remote control system 600 includes a power supply 602, a signal receiver board 630, a remote shuttle kill 640, a sweep solenoid 652 and a shuttle solenoid 654. Receiver board 630 includes a series of remotely activated relays 630A, 630B, 630C and 630D which switch power to sweep solenoid 652 and shuttle solenoid 654. Relays 630A, 630B, 630C and 630D may be adapted to receive radio signals from a separate control unit includes a switch activated signaling means.

Each solenoid 652 and 654 may be operated in one of three states, a neutral state, a forward state and a reverse state. When a solenoid is not activated and is in the neutral state, its respective valve is in a neutral position such that hydraulic fluid is not directed to its corresponding hydraulic motor. When in a positive and negative state, the solenoid will activate its corresponding hydraulic valve to cause hydraulic flow corresponding to either a forward or reverse motion of its corresponding hydraulic motor. Accordingly, when the state of sweep solenoid 652 is positive as a result of receiving a positive signal from relay 630A, hydraulic valve 552 is activated to cause forward movement of sweep motor 152. Likewise, when sweep solenoid 652 is negative as a result of receiving a negative signal from relay 630B, hydraulic valve 552 is activated to cause reverse movement of sweep motor 152. In the same way, when the state of shuttle solenoid 654 is positive as a result of receiving a positive signal from relay 630C, hydraulic valve 554 is activated to cause forward movement of sweep motor 154. Likewise, when the state of shuttle solenoid 654 is negative as a result of receiving a negative signal from relay 630D, hydraulic valve 554 is activated to cause reverse movement of sweep motor 154. Remote shuttle kill switch 640 prevents shuttle solenoid 554 from activating while a panel is sweeping or more particularly—while latch assembly 300 is in place. This prevents unnecessary stresses on the cables which shuttle panel 206. Remote shuttle kill switch 640 opens the shuttle circuit and does not close the circuit again until panel 206 returns to a position suitable for sweeping and latch assembly 300 is raised to allow panel 206 to shuttle. A detailed description of the design and operation of latch assemblies 300 is given below.

Figure 15B:
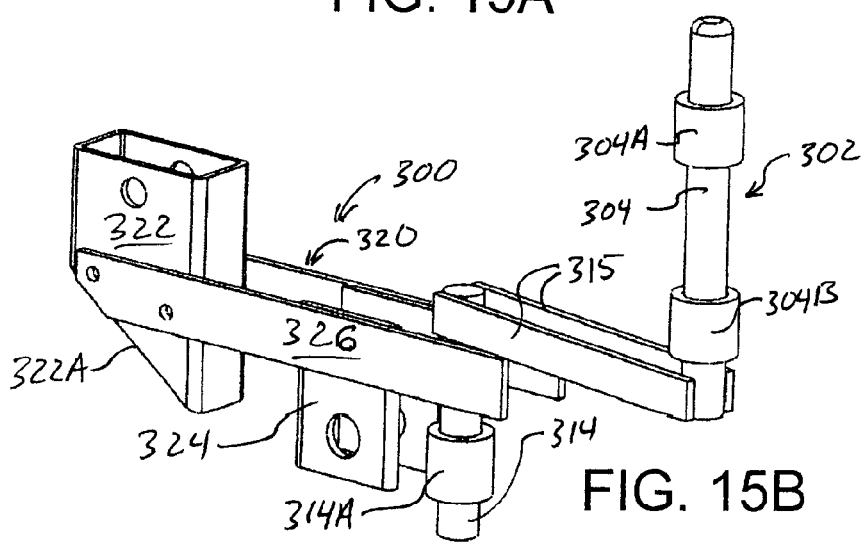
FIG. 15B is a perspective view of a latch assembly of the automatic turret unit of FIG. 15A.

FIG. 15A and FIG. 15B illustrate latch assemblies 300. Latch assemblies 300 are generally identical assemblies mounted to opposite sides of turret frame 174. Latch assemblies 300 are designed to alternately secure panel 206 to prevent shuttling movement when panel 206 is sweeping and release panel 206 to allow shuttling movement in the desired direction when panel 206 is position for shuttling. As shown in FIG. 15B, each latch assembly 300 includes a translating portion 302 and a pivoting portion 320. Translating portion 302 includes a first upright rod 304 slidably mounted to turret frame 174 by bushings 304A and 304B, a second upright rod 314 slidably mounted to turret frame 174 by bushing 314A and horizontal members 315 communicating between first upright rod 304 and second upright rod 314. Pivoting portion 320 is operatively associated with translating portion 302. Pivoting portion 320 includes a prawl member 322, pivoting plates 324 and lever members 326 fixed to prawl member 322 and pivoting plates 324. Pivoting plates 324 are pivotably mounted by a pin 328 to turret frame 174. FIG. 15A shows prawl member 322 in a lowered position such that it engages boss member 209 projecting from panel 206 thus preventing panel 206 from shuttling to the left as seen in FIG. 15A during a clockwise sweep. The operation of each latch assembly 300 also requires the presence of a skid plate 350 which is fixed to support frame 132. Skid plate 350 is positioned so that first upright rod 304 encounters skid plate 350 as panel 206 reaches the end of a clockwise sweep. When upright rod 304 encounters skid plate 350, translating portion 302 will shift down causing prawl member 322 to pivot up thus releasing boss member 209. When prawl member 322 releases boss member 209, panel 206, now extended to the left, may be shuttled to the right to a position substantially as shown in FIG. 15A. At the end of a shuttle movement, an opposite, identical boss member 209 on the opposite side of panel 206 from that shown in FIG. 15A, encounters the angled surface 322A of prawl member 322 which forces prawl member 322 to pivot up to clear the approaching boss member 209. When boss member 209 has passed under prawl member 322, prawl member falls in behind boss member 209. Thus latch assemblies 300 are designed so that a boss member is released on one side of panel 206 to permit the commencement of shuttling of panel 206 and also so that the boss member on the opposite side and the opposite end of the panel will be received and captured at the end of a shuttling movement. This sequence of actions including a clockwise sweep and a right shuttle returns panel 206 to a position opposite but substantially identical to that shown in FIG. 15A.

Detailed Description of a Manual Turret Unit

Figure 16:
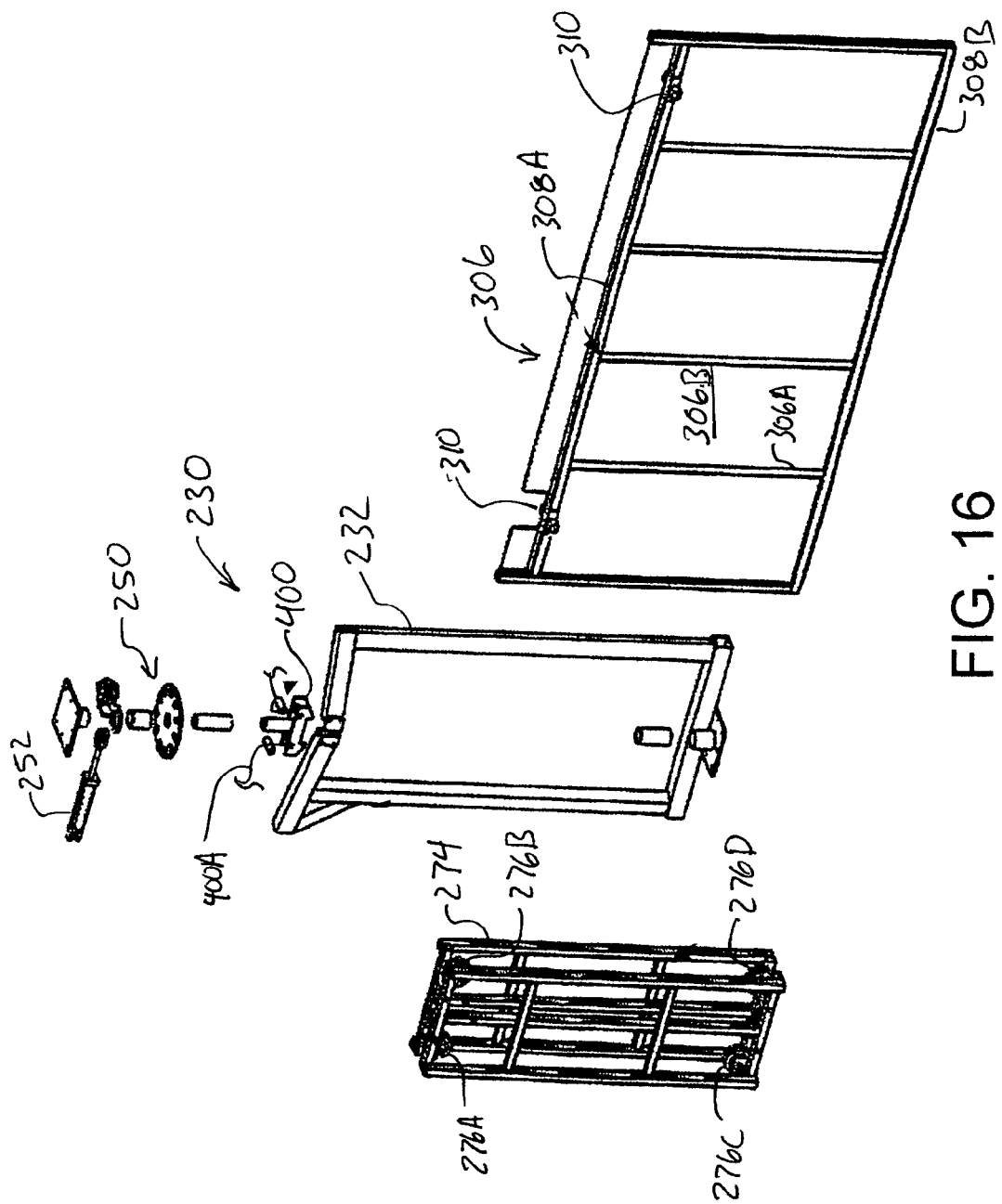
FIG. 16 is an exploded perspective view of a manual turret unit.
Figure 16A:
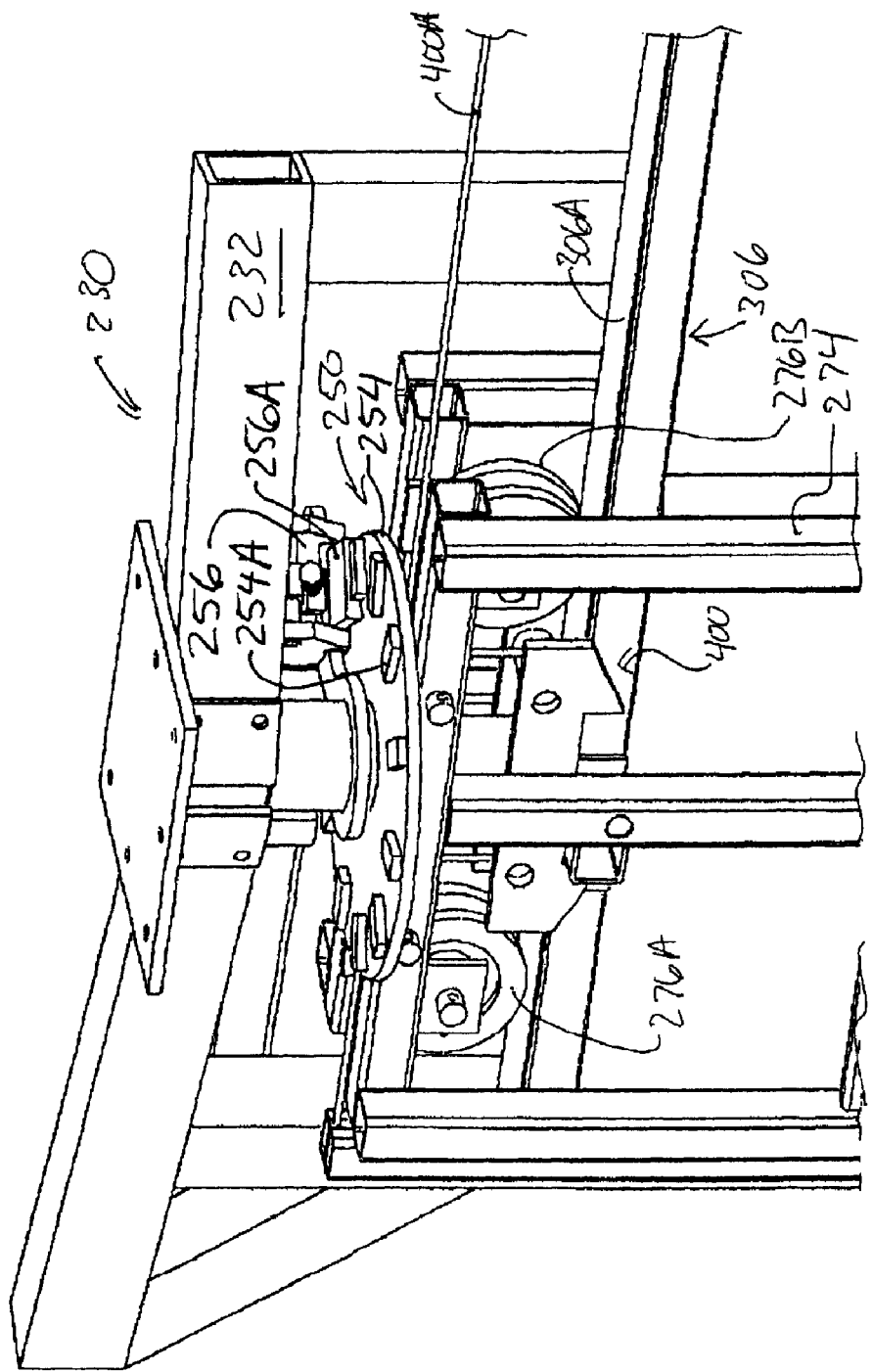
FIG. 16A is a perspective view of the upper portion of a manual turret unit.

FIGS. 16 and 16A provide detailed views of a manual turret unit 230. Manual turret unit 230 is intended as an example embodiment of a turret units which may be used for turret units 30A, 30B and 30C referred to above. Manual turret unit 230 is designed to provide a turret unit that can automatically sweep but must be manually shuttled back to an initial position. The primary advantage of this system is that it can be manufactured at a lower cost.

FIG. 16 is an exploded perspective view of manual turret unit 230. FIG. 16A is an enlarged perspective view of the upper portion of manual turret unit 230. FIGS. 16 and 16A show that manual turret unit 230 includes a support frame 232, a drive unit 250, a turret frame 274, a panel 306 and a latch assembly 400. As described above panel 206 includes rail members 308A and 308B which are received by grooved rollers 276A, 276B, 276C and 276D mounted to turret frame 274. Panel 306 includes projecting members 310 which are received and captured by latch assembly 400. Latch assembly 400 is biased by its weight in a lowered position but can be raised by pulling on cable 400A. Accordingly, panel 306 is locked by latch assembly 400 to prevent shuttling but can be released by a raising action with cable 400A to allow a shuttling movement of panel 306. Panel 306 also includes an opaque web 306B which is for visually isolating an operator or livestock handler from the livestock when a manual shuttling operation is conducted.

As can be seen in FIGS. 16 and 16A, drive unit 250 includes a two way hydraulic cylinder 252, a drive plate 254 and a ratchet mechanism 256. Hydraulic cylinder 252 is mounted to support frame 232. Drive plate 254 is fixed to turret frame 274. Ratchet mechanism 256 is rotatably mounted with respect to support frame 232 about the axis of rotation of turret frame 274. Drive plate 254 includes a series of teeth 254A radially disposed about the top surface of drive plate 254 and ratchet mechanism 256 includes a pivotably mounted flip member 256A which rotates up to allow the passage of teeth 254A as hydraulic cylinder 252 retracts but which also engages teeth 254A when hydraulic cylinder 254A is extending. Accordingly, the reciprocating retraction and extension of hydraulic cylinder 252 causes the intermittent driving of drive plate 254 as turret frame 274 rotates and sweeps panel 306. Panel 306 may sweep in a reverse direction (counter clockwise direction as seen in FIGS. 16 and 16A) but this must be done manually.

It is to be understood that while certain forms of this invention have been illustrated and described, it is not limited thereto, except in so far as such limitations are included in the following claims and allowable equivalents thereof.

Having thus described the invention, what is claimed as new and desired to be secured by Letters Patent is:

1. An apparatus for urging livestock through an enclosure having a path of travel along at least one arc shaped wall, comprising:

(a) a turret unit positioned in an arc defined by the at least one arc shaped wall, the turret unit further including a support frame, a turret frame and a panel operatively attached to the turret frame, the turret frame being rotatably mounted to the support frame, (b) the turret frame further including a translating assembly supporting the panel and moving the panel in a linear direction through the turret frame, from one end of the panel to an opposite end thereof, so that the panel can then be rotated along with the turret frame as the turret frame rotates through a defined arc of travel to thereby sweep the panel through an area bounded by the at least one arc shaped wall.

2. The apparatus of claim 1, further comprising:
a power unit associated with the turret unit that powers the rotation of the turret frame and that also powers the movement of the panel in a linear direction through the turret frame.

3. The apparatus of claim 1, further comprising:
a remotely controllable power unit associated with the turret unit that powers the rotation of the turret frame and which also powers the movement of the panel in a linear direction through the turret frame.

4. The apparatus of claim 1, further comprising;
a releasable latch mechanism associated with the turret frame and the panel for fixing the position of the panel relative to the turret frame when the turret frame is rotating in relation to the support frame.

5. The apparatus of claim 1, further comprising:
a hydraulic power unit for providing pressurized hydraulic fluid to a first hydraulic power device for rotating the turret frame and to second a hydraulic power device for powering the movement of the panel in a linear direction through the turret frame.

6. The apparatus of claim 1, further comprising:
a hydraulic power unit for providing pressurized hydraulic fluid to a first hydraulic power device for rotating the turret frame and to second a hydraulic power device for powering the movement of the panel in a linear direction through the turret frame,
the hydraulic power unit further including at least one hydraulic pressure relief valve that opens when more than a pre-determined amount of hydraulic pressure is being used to power the rotation of the turret frame or more than a pre-determined amount of hydraulic pressure is being used to power the translation of the panel.

7. The apparatus of claim 1, further comprising:
a hydraulic power unit for providing pressurized hydraulic fluid to a first hydraulic power device for rotating the turret frame and to second a hydraulic power device for powering the movement of the panel in a linear direction through the turret frame,
the hydraulic power unit further including a first hydraulic pressure relief valve that opens when more than a pre-determined amount of hydraulic pressure is being used to power the rotation of the turret frame and a second hydraulic pressure relief valve that opens when more than a pre-determined amount of hydraulic pressure is being used to power the translation of the panel, whereby not more than a pre-determined amount of force may be applied to a livestock animal by the rotation or translation of a panel.

8. An apparatus for moving livestock, comprising;
(a) a sequence of at least two semicircular enclosures defined by arc shaped walls positioned in a generally overlapping and opposing fashion such that the periphery of at least one enclosure extends generally to the center of curvature of an adjacent enclosure, (b) a turret unit positioned generally centrally of the arc defined by each arc shaped wall of each of said at least two semicircular enclosures, each turret unit further including a support frame, a turret frame and a panel operatively attached to the turret frame, the turret frame of each turret unit being rotatably mounted to the support frame of each turret unit, (c) each turret frame of each turret unit further including a translating assembly supporting the panel of the turret unit and moving the panel in a linear direction through the turret frame of the turret unit, from one end of the panel to an opposite end thereof, so that the panel can then be rotated along with the turret frame as the turret frame rotates through a defined arc of travel to thereby sweep the panel through an area bounded by the at least one arc shaped wall.

9. A method for moving at least one livestock animal between an entrance location and an exit location comprising the following steps;

(a) obtaining a sequence of at least two semicircular enclosures defined by arc shaped walls positioned in a generally overlapping and opposing fashion such that the periphery of at least one enclosure extends generally to the center of curvature of an adjacent enclosure, (b) obtaining a turret unit positioned generally centrally of the arc defined by each arc shaped wall of each of said at least two semicircular enclosures, each turret unit further including a support frame, a turret frame and a panel operatively attached to the turret frame, the turret frame of each turret unit being rotatably mounted to the support frame of each turret unit, (c) obtaining a translating assembly for supporting a panel in each turret frame further operable for moving the panel in a linear direction through the turret frame of the turret unit, from one end of the panel to an opposite end thereof, (d) introducing at least one livestock animal into the first enclosure, (e) translating the panel of the first turret unit through the first turret unit until the panel is between the at least one livestock animal and the entrance to the first enclosure, (f) rotating the first turret unit so that the panel of the first turret unit urges the at least one livestock animal through the first enclosure and into the second enclosure, (g) translating the panel of the second turret unit through the second turret unit until the panel is between the at least one livestock animal and the entrance to the second enclosure thereby blocking egress of the at least one livestock animal back into the first enclosure, (h) rotating the second turret unit so that the panel of the second turret unit urges the at least one livestock animal through the exit of the second enclosure.

10. The method of claim 9, wherein;

the at least one livestock animal is a group of more than one livestock animals.

11. The method of claim 9, wherein;

additional enclosures and turret units are combined with the first and second enclosures and turret units to fashion a series of enclosures and turret units capable of urging at least one livestock animal from the first enclosure through each successive enclosure and out through the exit of the last enclosure.

\* \* \* \* \*